United States Patent [19]

Alligood et al.

[11] Patent Number: 4,855,771
[45] Date of Patent: Aug. 8, 1989

[54] COMPACT CAMERA WITH FLASH UNIT MOVABLE TO REDUCE RED-EYE

[75] Inventors: John H. Alligood, Penfield; Joel S. Lawther, Rochester, both of N.Y.

[73] Assignee: Eastman Kodak Company, Rochester, N.Y.

[21] Appl. No.: 309,455

[22] Filed: Feb. 10, 1989

[51] Int. Cl.[4] ............................................. G03B 15/05
[52] U.S. Cl. ............................... 354/149.11; 354/126; 354/145.1
[58] Field of Search ............. 354/145.1, 149.1, 149.11, 354/126

[56] References Cited

U.S. PATENT DOCUMENTS

| | | | |
|---|---|---|---|
| 4,106,037 | 8/1978 | Nakamura et al. | 354/145.1 |
| 4,331,405 | 5/1982 | Yamamoto | 354/126 |
| 4,710,005 | 12/1987 | Bennett | 354/126 |

Primary Examiner—A. A. Mathews
Attorney, Agent, or Firm—Roger A. Fields

[57] ABSTRACT

A compace camera is of the type wherein a built-in flash unit is movable between a storage or folded position in which the flash unit is located relatively close to the camera objective lens and an erect position in which the distance between the flash unit and the objection lens is increased to reduce the possibility of red-eye when using the flash unit to take a picture. According to the invention, the flash unit is supported for movement from its storage position to its erect position generally along an arc extending diagonally of an upper surface of the camera body. The upper surface is longitudinally disposed between opposite ends of the camera body. Owing to this arrangement, the distance between the flash unit and the objective lens can be made greater (as compared to prior art devices) when the flash unit is in its erect position.

5 Claims, 2 Drawing Sheets

COMPACT CAMERA WITH FLASH UNIT MOVABLE TO REDUCE RED-EYE

CROSS-REFERENCE TO A RELATED APPLICATION

Reference is made to commonly assigned copending U.S. application Ser. No. 07/309,454 entitled Compact Camera Providing Direct and Indirect Flash, and filed Feb. 10, 1989, in the names of John H. Alligood and Joel S. Lawther.

BACKGROUND OF THE INVENTION

1. Field of the Invention

The invention relates generally to photography, and particularly to a compact camera with a built-in movable flash unit.

2. Description of the Prior Art

A current trend in camera design is to incorporate an electronic flash unit in the camera body and yet make such body relatively small in size in order to increase its ease of storage, portability, and handling. Examples of smaller size cameras with integral electronic flash units are the disk film cameras, the size 110 camera, and the compact 35mm cameras, sold by various camera manufacturers. As a consequence of making a camera body smaller in size, the separation between an integral flash unit and the camera objective lens is reduced, thereby possibly creating an undesirable effect commonly known as "red-eye". When using a flash unit and a color print film, red-eye is typified by the pupils in the eyes of a person being photographed coming out red-tinted on a developed color print. Such phenomenon is attributable to the incidence into the objective lens of the red light reflected from the retinas in the person's eyes illuminated by the flash light.

Red-eye may be substantially avoided by increasing the distance between the flash unit and the objective lens. As a result, light from the flash unit will reach the eyes of a person being photographed at too great an angle to be reflected by his retinas into the objective lens.

In U.S. Pat. No. 4,331,405, granted May 25, 1982, red-eye appears to be substantially avoided without increasing the size of a compact 35mm camera to any great degree by providing an electronic flash unit that is pivotable with respect to the camera body. The flash unit is pivotable between an inactive folded position in which it rests atop the camera body and an operative erect position in which it is elevated above the camera body sufficiently removed from the objective lens to permit picture-taking possibly without much occurrence of red-eye.

THE CROSS-REFERENCED APPLICATION

The application cross-referenced above discloses a compact camera wherein a built-in flash unit is movable between a storage or folded position and an erect position. The flash unit includes a flash light emission window that is arranged to face generally toward a subject to be photographed when the flash unit is in its erect position, to provide direct illumination of the subject, and to face substantially upward with respect to the subject when the flash unit is in its storage position, to provide indirect bounce illumination of the subject.

SUMMARY OF THE INVENTION

As compared to the prior art described above, the invention advantageously provides a compact camera wherein the distance between a built-in movable flash unit and the camera objective lens can be made greater (than in the prior art) when the flash unit is in its operative erect position. Thus, the possibility of red-eye is further reduced.

According to the invention, there is provided an improved photographic camera wherein a flash unit is movable with respect to the camera body between a storage position in which the flash unit is located relatively close to the camera objective lens and an erect position in which the distance between the flash unit and the objective lens is increased to reduce the possibility of red-eye when using the flash unit to take a picture, and wherein the improvement comprises:

means supporting the flash unit for movement from its storage position to its erect position generally along an arc extending diagonally of an upper surface of the camera body longitudinally disposed between opposite ends of the camera body, whereby the distance between the flash unit and the objective lens can be made greater (as compared to the prior art) when the flash unit is in its erect position.

DETAILED DESCRIPTION OF THE PREFERRED EMBODIMENT

The invention is described as being embodied in a compact 35mm camera having a movable electronic flash unit. Because such photographic cameras and flash units are generally well known, this description is directed in particular to camera and flash elements forming part of or cooperating directly with the preferred embodiment. It is to be understood, however, that camera and flash elements not specifically shown or described may take various forms known to persons of ordinary skill in the art.

Figure 1:
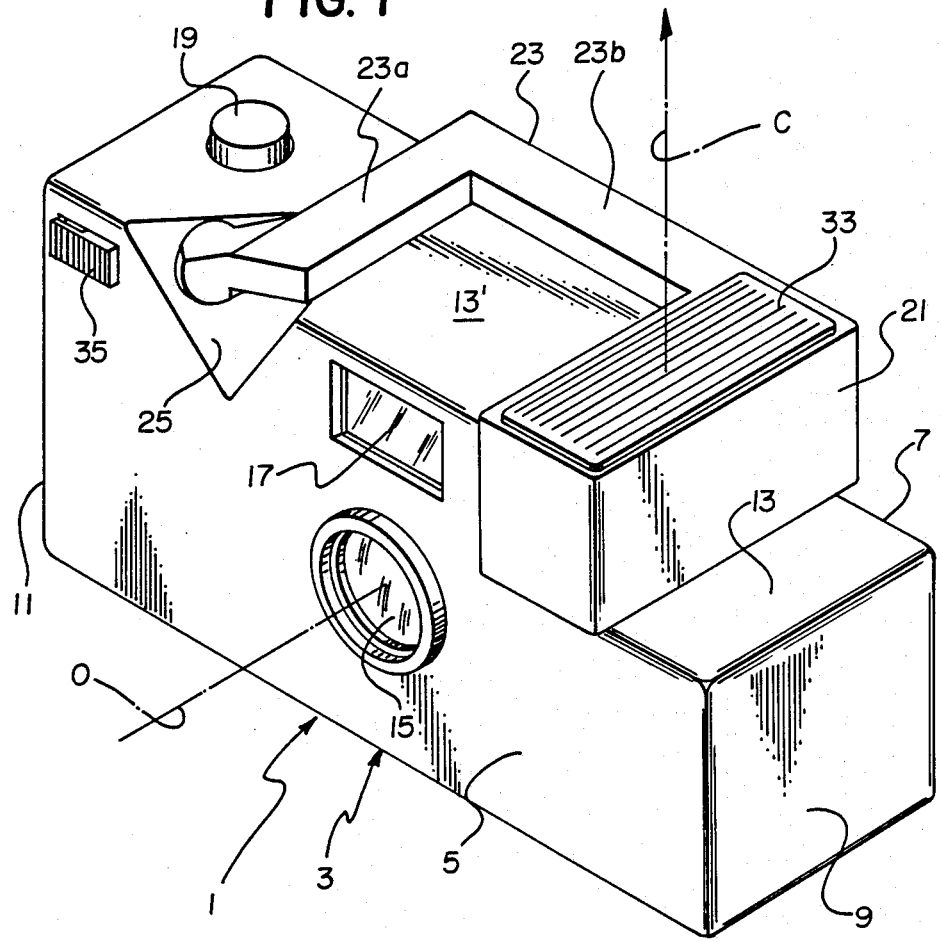
FIG. 1 is a front perspective view of a compact camera with a built-in movable flash unit according to a preferred embodiment of the invention, showing the flash unit in a storage or folded position.
Figure 2:
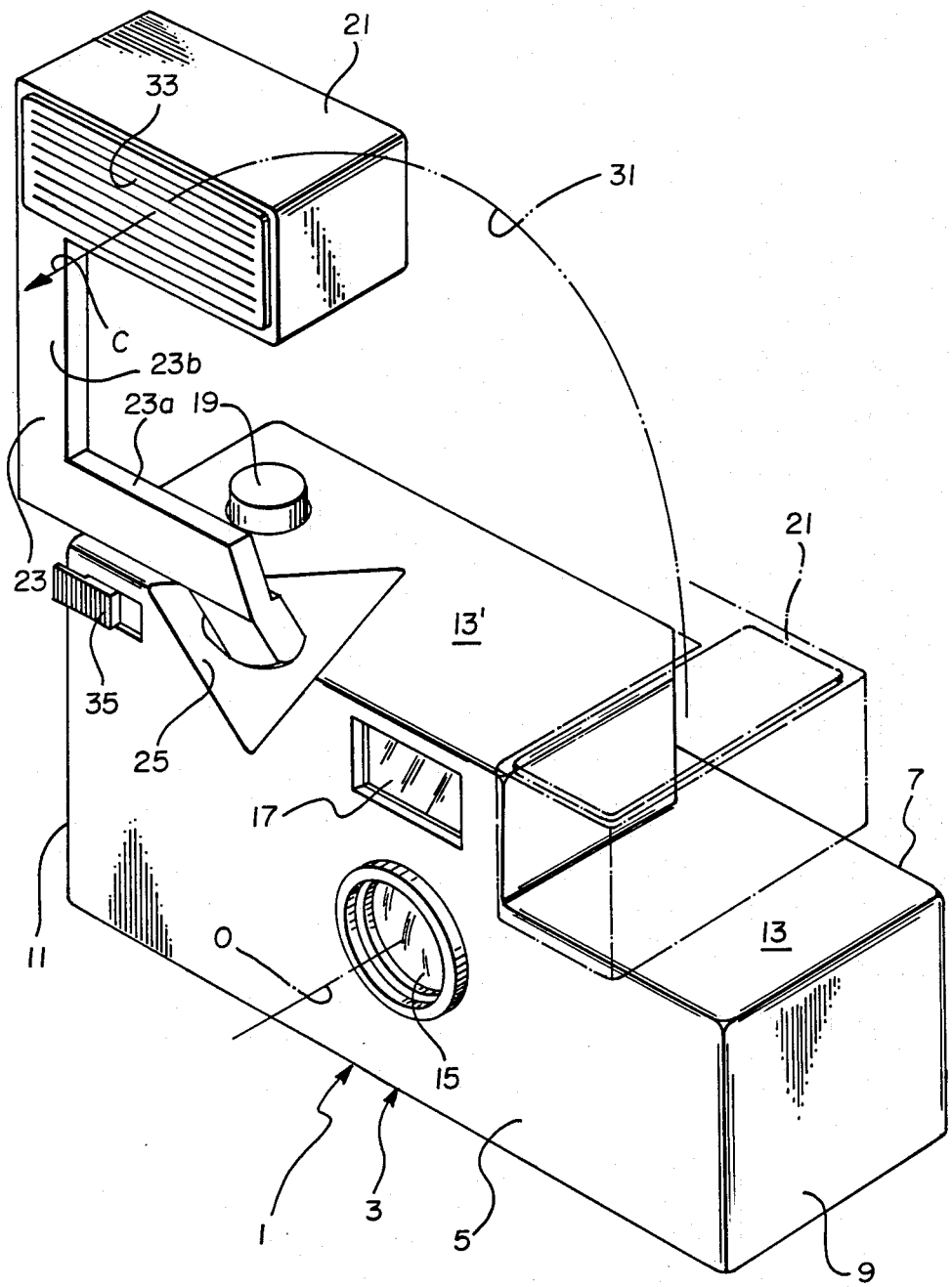
FIG. 2 is a front perspective view of the compact camera, showing the flash unit moved to an erect position from its storage position.

Referring now to the drawings, FIGS. 1 and 2 depict a compact 35mm camera 1 having a camera body 3. The camera body 3 has front and rear faces 5 and 7, opposite ends 9 and 11, and a two-tier upper surface 13, 13'. A conventional objective lens 15 and a viewfinder window 17 are located inwardly of the front face 5 of the camera body 3 and a depressible shutter release button 19 is located at the upper surface 13' of the camera body.

Figure 3:
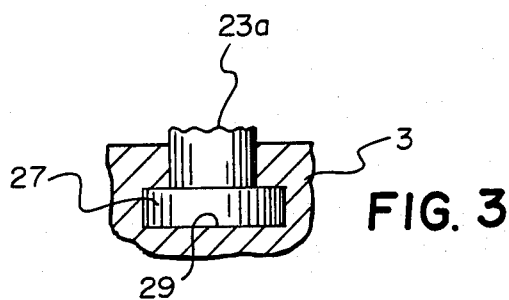
FIG. 3 is a sectional view of a pivotable coupling between the flash unit and the camera body.

An electronic flash unit 21 is movable with respect to the camera body 3 between a storage or folded position, shown in FIG. 1, and an erect position, shown in FIG. 2. In its storage position, the flash unit 21 longitudinally extends widthwise of the camera body 3 and is situated atop the upper surface 13 of the camera body. In its erect position, the flash unit 21 is elevated substantially above the upper surface 13' of the camera body 3 and longitudinally extends lengthwise of that surface. An extension arm 23 for elevating the flash unit 21 above the upper surface 13' comprises a first longitudinal section 23a pivotally connected to the camera body 3 at a front-top recess 25 in the camera body and a second longitudinal section 23b joining the first longitudinal section and the flash unit. The pivotal connection between the first longitudinal section 23a and the camera body 3 is effected by locating an annular end flange 27 of that longitudinal section within a mating cavity 29 in the camera body as shown in FIG. 3. Due to the location of the pivotal connection between the first longitudinal section 23a and the camera body 3 at the front-top recess 25 and a right angle relation between the first longitudinal section and the second longitudinal section 23b, the flash unit 21 is supported for movement between its storage and erect positions generally along an arc 31 which extends diagonally of the upper surfaces 13, 13' as shown in FIG. 2. Thus, the distance between the flash unit 21 and the objective lens 15 can be made greater (as compared to prior art devices, such as disclosed in U.S. Pat. No. 4,331,405) when the flash unit is in its erect position.

When the flash unit 21 is in its erect position as shown in FIG. 2, a flash light emission window 33 of the flash unit is arranged to face generally toward a subject to be photographed, i.e. in the same direction as the objective lens 15, to provide direct illumination of the subject. In other words, the center-line C of a flash beam emitted from the window 33 will be disposed parallel to the optical axis 0 of the objective lens 15. When the flash unit 21 is in its storage position as shown in FIG. 1, the window 33 is arranged to face substantially upward with respect to the subject, i.e. in an upward direction with respect to the objective lens 15, to provide indirect bounce illumination of the subject. In other words, the center-line C of a flash beam emitted from the window 33 will be disposed upright of the optical axis 0 of the objective lens 15.

A flash on/off operating member 35 is located on the front face 5 of the camera body 3. The operating member 35 is mounted for movement from its normal "off" position, shown in FIG. 1, in which it maintains a conventional flash charging circuit (not shown) de-energized, to an "on" position, shown in FIG. 2, in which it operates to close a switch (not shown) to effect energization of the charging circuit. In its "on" position, the operating member 35 extends beyond the one side 11 of the camera body 3 to serve as a reminder to return the operating member to its "off" position.

The invention has been described with reference to a preferred embodiment. However, it will be understood that various modifications can be effected within the ordinary skill in the art without departing from the scope of the invention.

We claim:

1. An improved photographic camera wherein a flash unit is movable with respect to the camera body between a storage position in which said flash unit is located relatively close to the camera objective lens and an erect position in which the distance between the flash unit and said objective lens is increased to reduce the possibility of red-eye when using said flash unit to take a picture, and wherein the improvement comprises:

means supporting said flash unit for movement from its storage position to its erect position generally along an arc extending diagonally of an upper surface of said camera body longitudinally disposed between opposite ends of the camera body, whereby the distance between said flash unit and said objective lens can be made greater when the flash unit is in its erect position.

2. The improvement as recited in claim 1, wherein said supporting means is adapted to arrange said flash unit to longitudinally extend widthwise of said upper surface of the camera body when the flash unit is in its storage position.

3. The improvement as recited in claim 2, wherein said supporting means is adapted to arrange said flash unit folded against said upper surface of the camera body when said flash unit is in its storage position.

4. The improvement as recited in claim 3, wherein said supporting means is adapted to arrange said flash unit elevated substantially above said upper surface of the camera body and longitudinally extending lengthwise of the upper surface when the flash unit is in its erect position.

5. The improvement as recited in claim 4, wherein said supporting means includes an extension member for elevating said flash unit substantially above said upper surface of the camera body when the flash unit is in its erect position, said extension member having a first longitudinal section pivotally connected to said camera body generally in the vicinity of a front area of the camera body and extending widthwise of said upper surface when said flash unit is in its storage position and having second longer section joining said first longitudinal section and said flash unit and extending lengthwise of said upper surface when the flash unit is in its storage position.

* * * * *